US012767375B2

(12) United States Patent
Winzinger

(10) Patent No.: US 12,767,375 B2
(45) Date of Patent: Oct. 20, 2026

(54) DEVICE AND METHOD FOR LABELING OBJECTS

(71) Applicant: KRONES AG, Neutraubling (DE)

(72) Inventor: Frank Winzinger, Regensburg (DE)

(73) Assignee: KRONES AG, Neutraubling (DE)

( * ) Notice: Subject to any disclaimer, the term of this patent is extended or adjusted under 35 U.S.C. 154(b) by 230 days.

(21) Appl. No.: 18/270,769

(22) PCT Filed: Dec. 16, 2021

(86) PCT No.: PCT/EP2021/086092
§ 371 (c)(1),
(2) Date: Jul. 3, 2023

(87) PCT Pub. No.: WO2022/144182
PCT Pub. Date: Jul. 7, 2022

(65) Prior Publication Data

US 2024/0051697 A1 Feb. 15, 2024

(30) Foreign Application Priority Data

Jan. 4, 2021 (DE) ......................... 102021100018.1

(51) Int. Cl.
*B65C 9/00* (2006.01)
*B65C 9/02* (2006.01)
(Continued)

(52) U.S. Cl.
CPC .............. *B65C 9/0062* (2013.01); *B65C 9/02* (2013.01); *B65C 9/1826* (2013.01); *B65C 9/20* (2013.01);
(Continued)

(58) Field of Classification Search
CPC ....... B65C 9/0062; B65C 9/02; B65C 9/1826; B65C 9/20; B65C 9/30; B65C 9/42; B65C 9/46
See application file for complete search history.

(56) References Cited

U.S. PATENT DOCUMENTS 4,172,753 A 10/1979 Benoit
6,401,787 B1 6/2002 Tsutsumi et al.
(Continued)

FOREIGN PATENT DOCUMENTS

AU 43888/89 B 10/1989
CN 1865088 A 11/2006
(Continued)

OTHER PUBLICATIONS

English Abstract for DE 202016105934 U1.
(Continued)

*Primary Examiner* — George R Koch
(74) *Attorney, Agent, or Firm* — Caesar Rivise, PC

(57) ABSTRACT

The invention relates inter alia to a device (1) for labeling objects (3), preferably containers. The device (1) includes a label conveyor (7) for conveying a plurality of labels (2) along a circulating conveyor track (19) by means of multiple movement devices (20). The label conveyor (7) has a plurality of module docking stations (52). At least one auxiliary unit module is connected to one of the plurality of module docking stations (52). Advantageously, the flexibility of the device (1) can thus be substantially increased.

22 Claims, 8 Drawing Sheets

(51) Int. Cl.

| | |
|---|---|
| ***B65C 9/18*** | (2006.01) |
| ***B65C 9/20*** | (2006.01) |
| ***B65C 9/30*** | (2006.01) |
| ***B65C 9/42*** | (2006.01) |
| ***B65C 9/46*** | (2006.01) |

(52) U.S. Cl.

CPC .................. *B65C 9/30* (2013.01); *B65C 9/42* (2013.01); *B65C 9/46* (2013.01)

(56) References Cited

U.S. PATENT DOCUMENTS

| | | | | |
|---|---|---|---|---|
| 7,182,115 | B2 | 2/2007 | Sindermann et al. | |
| 7,252,131 | B2 | 8/2007 | Draghetti et al. | |
| 7,845,379 | B2 | 12/2010 | Koertge et al. | |
| 9,522,780 | B2 | 12/2016 | Achhammer et al. | |
| 9,731,855 | B2 | 8/2017 | Zwilling | |
| 9,878,813 | B2 | 1/2018 | Eberhardt et al. | |
| 2003/0010433 | A1* | 1/2003 | Williamson .............. | B65C 9/44 156/250 |
| 2004/0177931 | A1* | 9/2004 | Baumli ................. | G09F 3/0289 156/539 |
| 2005/0034423 | A1* | 2/2005 | Sindermann .......... | B65C 9/0062 53/136.1 |
| 2010/0152883 | A1* | 6/2010 | Achhammer .......... | B65G 43/00 700/214 |
| 2014/0251523 | A1* | 9/2014 | Kellhammer .......... | H04B 3/542 156/60 |
| 2020/0189896 | A1 | 6/2020 | Raith et al. | |
| 2020/0317384 | A1 | 10/2020 | Giuliani et al. | |

FOREIGN PATENT DOCUMENTS

| | | | | |
|---|---|---|---|---|
| DE | 60208519 | T2 | 8/2006 | |
| DE | 102008062580 | A1 | 6/2010 | |
| DE | 102014214696 | A1 | 1/2016 | |
| DE | 202016105934 | U1 | 9/2017 | |
| DE | 102016115031 | A1 | 2/2018 | |
| DE | 102017209838 | A1 | 12/2018 | |
| EP | 1493671 | A1 | 1/2005 | |
| EP | 3034420 | A1 * | 6/2016 | ........... B65C 9/0062 |
| WO | 2016142200 | A1 | 9/2016 | |
| WO | 2018202320 | A1 | 11/2018 | |
| WO | 2019120466 | A1 | 6/2019 | |
| WO | 2020088923 | A1 | 5/2020 | |

OTHER PUBLICATIONS

English Abstract for DE 102016115031 A1.

International Search Report for PCT/EP2021/086092 dated Apr. 22, 2022.

* cited by examiner

DEVICE AND METHOD FOR LABELING OBJECTS

CROSS-REFERENCE TO RELATED APPLICATIONS

This application is a U.S. National Phase Application of PCT/EP2021/086092, filed Dec. 16, 2021, which claims priority to DE 10 2021 100 018.1, filed Jan. 4, 2021, the contents of which applications are incorporated herein by reference in their entireties for all purposes.

TECHNICAL FIELD

The invention relates to a device for labeling objects, and preferably containers in a container treatment facility. The invention also relates to a system, a method, and an auxiliary unit module.

TECHNICAL BACKGROUND

Container treatment facilities can have labeling machines for labeling containers. In general, labeling machines can be used to label any type of objects.

WO 2018/202320 A1 discloses a labeling machine for applying label sheets to articles. A web feed unit feeds a web of label material formed from a series of label sheets connected to one another. A label transfer device receives the web from the web feed device at an input station and is designed to feed individual label sheets to respective articles at an attachment station spaced apart from the input station. A cutting device cuts the web of label material into individual label sheets. The label transfer device has a conveyor which is designed such that it holds back the label sheets and releases the label sheets themselves onto the articles at the attachment station. The conveyor has a closed transfer path and at least two label holders which are movable on the transfer path by means of a magnetically-inductive interaction.

A disadvantage of the labeling machine known from WO 2018/202320 A1 is that it is relatively inflexible and is suitable, for example, only for simple labeling tasks.

The object of the invention is to provide an improved device for labeling, which can preferably be used flexibly for different labeling tasks.

SUMMARY OF THE INVENTION

The object is achieved by the invention.

One aspect of the present disclosure relates to a device for labeling objects, and preferably containers (e.g., bottles, cans, canisters, cartons, vials, etc.). The device has an object conveyor for conveying the objects (e.g., by means of object holders of the object conveyor). The device has a label conveyor for conveying several labels along a circulating conveyor track by means of several movement devices (e.g., movable independently of one another). The device has an application region in which the labels conveyed by the label conveyor can be applied to the objects conveyed by the object conveyor.

The device has at least one auxiliary unit module from the group of: a cutting device for cutting the labels from a label web, a printing device for printing the labels, an adhesive device for applying an adhesive to the labels, a camera device for monitoring the several movement devices and/or the labels, a service conveyor for unloading movement devices from the label conveyor and loading movement devices onto the label conveyor, at least one label web feed device for feeding label webs, a splicing device for connecting the ends of two label rolls, and a buffer device for buffering labels. The label conveyor has several module docking stations, and the at least one auxiliary unit module is releasably connected to one of the several module docking stations.

Advantageously, the module docking stations enable modular equipping of the label conveyor with different auxiliary unit modules.

The device can thus be changed, expanded, or rebuilt at any time in order to adapt the device to the respective current requirements.

The adjustment may be possible within operating pauses or also during operation of the device.

The adjustment can be used, for example, to achieve a change in performance (change in throughput), an object format changeover, and/or a label changeover.

It is possible, in a larger facility, for auxiliary unit modules to be shared between several devices for labeling.

It is also possible for different auxiliary unit modules of the same type (for example, different cutting devices, different printing devices, different camera devices, different label web feed devices, different adhesive devices, different service conveyors) to be able to be releasably connected to the module docking stations, depending upon the requirement. All this can significantly increase the flexibility of the device.

In particular, the label conveyor itself can also represent an exchangeable module, which in turn is releasably connected to a part of the object conveyor or the device at a label conveyor docking station. It is thus possible for the label conveyor, including at least one auxiliary unit module, to be exchangeable.

Preferably, the at least one auxiliary unit module can be directly connected to the label conveyor.

In a further exemplary embodiment, at least one of the auxiliary unit modules (e.g., one, two, three, . . . , auxiliary unit modules of the at least one auxiliary unit module) can be selectively connected to each of the module docking stations (e.g., releasably), and/or the several module docking stations are configured identically. An enlarged freedom with respect to the modular layout of the device for labeling can thus advantageously be achieved.

In a further exemplary embodiment, the several module docking stations and/or the at least one auxiliary unit module each have a mechanical connector and/or an electrical connector and/or a pneumatic connector.

Advantageously, the auxiliary unit modules can thus be fixed to the label conveyor by means of the module docking stations.

The mechanical connector can in particular have at least one (preferably two) pins on which a hole (two holes) of the auxiliary unit module can be placed. The pins can preferably be conical formations which fit into the respective holes or bores of the auxiliary unit modules and are formed as a negative of the formation. In this way, centering and precise alignment are ensured.

In particular, it may be the case that at least the mechanical connector is adjustable in height. In particular, after the connection or docking of an auxiliary unit module to/on the label conveyor, the auxiliary unit module can be raised, in order, for example, to achieve independence from the unevenness of the hall floor during the alignment.

By means of the pneumatic connection, a vacuum or compressed air can be transmitted, for example, which can be used, for example, when applying the adhesive or printing (suction of fine droplets).

Alternatively or additionally, a signal transmission and/or an energy transfer between the label conveyor and the auxiliary unit modules can be made possible by means of the module docking stations.

The electrical connectors and the pneumatic connectors can each be connected independently of the mechanical connection. For example, the connectors can be arranged at different locations. For example, it may be that the electrical connector is realized via an additional cable connection.

In one embodiment, however, it is possible that simultaneous connection of the mechanical and electrical, and in particular also the pneumatic connector, are carried out/can be carried out. In particular, this can take place with the same movement.

In particular, an auxiliary unit module can be releasable from a module docking station without the aid of a tool, or without tools.

In particular, an auxiliary unit module can be connectable to a module docking station without the aid of a tool, or without tools.

It may be the case that several auxiliary unit modules can be exchanged in groups—for example, can be undocked simultaneously via a common interchangeable carriage.

In particular, auxiliary unit modules can be connectable to the module docking stations by means of a manually actuatable, quick-release fastener (for example, a bayonet connection or via a quick-release device).

In particular, auxiliary unit modules can be connectable to the module docking stations by means of an automatically actuatable closure.

In particular, all the electrical connectors of all module docking stations can have the same plug connection—in particular, having a contact for information (e.g., Ethernet connection) and a contact for energy (e.g., CEE plug connector connection).

In a further exemplary embodiment, the several module docking stations each have at least two, mutually-spaced module docking sites for connecting to the same auxiliary unit module. Advantageously, for example, a particularly secure hold of the respective auxiliary unit module at the respective module docking station can be ensured, and/or a redundant signal transmission and/or energy transmission can be made possible in this way.

In one embodiment, the several module docking stations are arranged at least in part on an inner peripheral side with respect to the circulating conveyor track. Advantageously, this can make it possible, for example, for the auxiliary unit modules connected to the module docking stations to treat or check a front side of the labels. Preferably, the camera device and/or the printing device can be releasably connected to a module docking station arranged on the inner peripheral side.

In the further embodiment, the several module docking stations are arranged on several, and preferably all, peripheral sides of the (for example, triangular or rectangular) label conveyor. An enlarged freedom with respect to the modular layout of the device for labeling can thus advantageously be achieved.

In one embodiment variant, at least one of the auxiliary unit modules (e.g., one, two, three, etc., auxiliary unit modules of the at least one auxiliary unit module) is mounted movably on rollers. It can thus advantageously be achieved that the auxiliary unit modules be able to be moved in a simple manner to the module docking stations and between the module docking stations.

In a further embodiment variant, the device has at least one automated guided vehicle (AGV), and at least one of the auxiliary unit modules (e.g., one, two, three, etc., auxiliary unit modules of the at least one auxiliary unit module) has a coupling for coupling to the at least one automated guided vehicle. Alternatively or additionally, at least one of the auxiliary unit modules (e.g., one, two, three, etc., auxiliary unit modules of the at least one auxiliary unit module) is configured as an automated guided vehicle. It can thus advantageously be achieved that the modular equipping of the label conveyor be able to be carried out in an automated or at least partially automated manner.

In a further embodiment variant, the device has a further label conveyor for conveying several further labels, e.g., along a further closed conveyor track, by means of preferably several further movement devices (e.g., movable independently of one another), the further label conveyor having several further module docking stations. Preferably, at least one (for example, the service conveyor) of the auxiliary unit modules (e.g., one, two, three, etc., auxiliary unit modules of the at least one auxiliary unit module) can be movable back and forth between the label conveyor and the further label conveyor for selective connection to one of the several module docking stations and the several further module docking stations—preferably by means of rollers (for example, of the respective auxiliary unit module) and/or by means of an automated guided vehicle. It can thus advantageously be achieved that several facility parts of an overall facility be able to share at least one of the auxiliary unit modules. Preferably, for example, the service conveyor can be shared by the label conveyor and the further label conveyor.

Preferably, the several further module docking stations can be configured like the several module docking stations.

In particular, at least 50%, and preferably all, of the module docking stations can be substantially structurally identical.

In one exemplary embodiment, the label conveyor has a long-stator linear drive, a short-stator linear drive, or a planar drive, for magnetically-inductive driving of the several movement devices. This exemplary embodiment can also be implemented independently of the presence of the at least one auxiliary unit module and/or the several module docking stations in the device for labeling as disclosed herein.

In a further exemplary embodiment, the printing device is arranged within the circulating conveyor track, and/or the printing device is arranged for printing through a passage (e.g., gap, slot, recess, or passage opening, etc.) in the conveyor track when printing on the labels. This can, advantageously, allow for printing of the front side of the label. This exemplary embodiment can also be implemented independently of the presence of the at least one auxiliary unit module and/or the several module docking stations in the device for labeling as disclosed herein.

For example, a laser printer prints through the passage, or an ink supply line or a print head of an inkjet printer passes through the passage.

In a further exemplary embodiment, the closed conveyor track has substantially a triangular shape or a rectangular shape in a plan view of the device, and/or the circulating conveyor track is oriented substantially vertically.

In one embodiment, the several movement devices have several rollers which support the several movement devices on the guide track, and preferably in each case simultaneously on several (e.g., vertically-spaced) guide rails of the guide track. It can thus advantageously be achieved that a force be able to be exerted when applying the label to the object, so that the object can be labeled reliably and firmly. This embodiment can also be implemented independently of the presence of the at least one auxiliary unit module and/or the several module docking stations in the device for labeling as disclosed herein.

In a further embodiment, the several movement devices each have a label holder for holding the labels. Preferably, the several movement devices can each have a roller which is arranged above the label holder, and a roller which is arranged below the label holder. Alternatively or additionally, the several movement devices can each have a roller which is arranged such that a pressing torque for pressing the label onto the object can be brought about by supporting this roller on the guide track. Alternatively or additionally, the several movement devices can each have a roller which is arranged in front of the label holder with respect to a forward movement direction of the respective movement device, and a roller which is arranged behind the label holder with respect to the forward movement direction.

In a further embodiment, the service conveyor has a circulating conveyor track, along which the several movement devices can be moved. It is possible for the circulating conveyor track of the service conveyor to have a smaller number of guide rails, arranged one above the other, for supporting the several movement devices than the label conveyor. Alternatively or additionally, the service conveyor can have a long stator which is preferably arranged above or below the circulating guide track of the service conveyor and/or is arranged so as to be vertically offset with respect to a long stator of the label conveyor. As a result, a construction of the service conveyor can advantageously be simplified in comparison to the construction of the label conveyor, taking into account the knowledge that the support of the movement devices by the service conveyor must be less strong than by the label conveyor. Only the label conveyor is arranged in the application region, for applying the labels, so that in particular the label conveyor can benefit from improved support of the movement devices, for improving the application of the labels to the objects.

In one embodiment variant, the several movement devices each have a pneumatic holder, and preferably a perforated plate, for holding the labels. It is possible for the label conveyor to have a—preferably valve-free and/or slot-controlled—suction line system having a stationary inlet (for example, having several openings arranged in series and/or at least one longitudinal opening)—preferably only upstream of the application region (e.g., up to the label web feed device). A fluid connection between the inlet and the pneumatic holder occurs, during a movement of the respective movement device along the conveyor track of the label conveyor, by means of sliding contact (and, for example, slot-controlled) to the stationary inlet. Alternatively or additionally, the label conveyor can have, for example, a—preferably valve-free and/or slot-controlled—compressed air line system having a stationary outlet (for example, having several openings arranged in series and/or at least one longitudinal opening)—preferably only in the application region. A fluid connection between the outlet and the pneumatic holder occurs, during a movement of the respective movement device along the conveyor track of the label conveyor, by means of sliding contact (and, for example, slot-controlled) to the stationary outlet. Advantageously, a complicated pneumatic system having rotatable tanks and/or rotatable flexible lines, as in the prior art, can thus be dispensed with. It is also possible for shut-off valves in the suction line system and/or in the compressed air line system to be dispensed with, since the establishment and separation of the fluid connection can take place in a slot-controlled manner when the inlet and/or the outlet are swept over by means of the movement devices. This embodiment variant can also be implemented independently of the presence of the at least one auxiliary unit module and/or the several module docking stations in the device for labeling as disclosed herein.

In a further embodiment variant, the label conveyor has at least one sliding seal—preferably stationary on the label conveyor and/or movable on the several movement devices—which is arranged for sealing the sliding contact. Advantageously, the sliding seal can enable reliable and accurate actuation of the pneumatic holder.

In a further embodiment variant, the inlet and/or the outlet is arranged above, below, or at the level of the conveyor track of the label conveyor. Preferably, the arrangement of the inlet and/or the outlet above or below the conveyor track can be used in embodiments in which the label conveyor has a planar drive. In this way, the provision of passages in the base element of the planar drive can preferably be avoided, and the movement devices can instead be brought into fluid connection with the inlet and/or the outlet at an overhang of the respective movement devices, via the base element. The technique is also applicable in a long-stator linear drive or a short-stator linear drive.

In one exemplary embodiment, the label conveyor has a planar drive having a base element which forms the conveyor track and is oriented substantially vertically, and the several movement devices which are movable by means of magnetic interaction between the base element and the several movement devices via the base element. Advantageously, the planar drive can significantly increase the flexibility of the device, since, for example, labels can readily be applied at different heights of the objects, e.g., also simultaneously by means of several movement devices, and/or movement devices can overtake one another. This exemplary embodiment can also be implemented independently of the presence of the at least one auxiliary unit module and/or the several module docking stations in the device for labeling as disclosed herein.

In a further exemplary embodiment, the base element has an enlarged vertical extension in the application region, so that labels can preferably be applied at different heights.

In a further exemplary embodiment, an upper portion of the base element has a curvature, in the application region, towards the object conveyor, so that labels can preferably be applied to conical object portions.

In a further exemplary embodiment, the base element is height-adjustable in the application region. Preferably, a height position of the curved upper portion can thus be adapted to a position of the conical portion for different object formats.

In a further exemplary embodiment, the object conveyor is a conveyor carousel, and the label conveyor extends in an arcuate manner in the application region, along an arcuate portion of the conveyor carousel, so that several labels can preferably be applied to the same object (for example, on a front side and on a rear side of the object).

In one embodiment, the several movement devices each carry a setting device which is configured to change an angle of incidence of a label holder with respect to the respective movement device, so that labels can preferably be applied to conical object portions.

In a further embodiment, the device has a control unit which is configured to operate the several movement devices upstream of the application region so as to rotate, and preferably roll, about a current movement direction of the respective movement device, so that labels can preferably be applied to conical object portions.

Preferably, the term, “control unit,” can refer to an electronic system (e.g., having microprocessor(s) and data memory) and/or a mechanical, pneumatic, and/or hydraulic controller which can take over control tasks and/or regulation tasks and/or processing tasks, depending upon the design. Although the term, “control,” is used herein, this can also comprise or be understood as “regulate” or “feedback-control” and/or “process.”

Preferably, the movement devices can each be movable or drivable independently of one another.

A further aspect of the present disclosure relates to a system having a first device as disclosed herein and a second device—preferably as disclosed herein— having a module docking station, wherein it is possible for the label conveyor of the first device to be docked on the second device or for at least one of the auxiliary unit modules of the first device to be docked at least indirectly on the module docking station of the second device.

The second device can also, for example, be a different machine for treatment (conveying, blowing, filling, closing, inspecting, packaging, palletizing, etc.) of articles.

The auxiliary unit modules can thus also be used on other machines, e.g., on a labeling machine, an adjacent filling line, or, for example, the camera module on a packer of the same filling line, for checking the labels applied there on packs.

In this context, “at least indirectly” can mean that the auxiliary modules, including the label conveyor, can be separated from the first device and attached to the second device.

Another aspect of the present disclosure relates to a method for operating a label conveyor (e.g., in or by means of a device as disclosed herein), comprising:

- conveying labels by the label conveyor, by means of several movement devices driven independently of one another;
- labeling objects;
- treating the labels at least indirectly using an auxiliary unit module; and
- docking and/or undocking of an auxiliary unit module on or from the label conveyor.

The indirect treatment preferably relates to the service conveyor as an auxiliary module, because a treatment of the labels by the latter is not carried out directly, but only by the loading of further movement devices into the label treatment stretch from the splicing device, via the feed device, up to the label delivery on the objects.

A further aspect of the invention relates to an auxiliary unit module for at least indirectly treating labels, wherein the auxiliary unit module is configured for connection to a module docking station of a label conveyor of the device disclosed herein.

In one exemplary embodiment, the auxiliary unit module has at least one mechanical connector for the tool-free docking or undocking of the module docking station.

The preferred embodiments and features of the invention described above can be combined with one another as desired. In particular, the aspects of the device can also be used or implemented in the method, and vice versa.

BRIEF DESCRIPTION OF THE FIGURES

Further details and advantages of the invention are described below with reference to the accompanying drawings, in which.

The embodiments shown in the figures correspond at least in part, so that similar or identical parts are provided with the same reference signs, and, for the explanation thereof, reference is also made to the description of other embodiments or figures to avoid repetition.

DETAILED DESCRIPTION OF EMBODIMENTS

Figure 1:
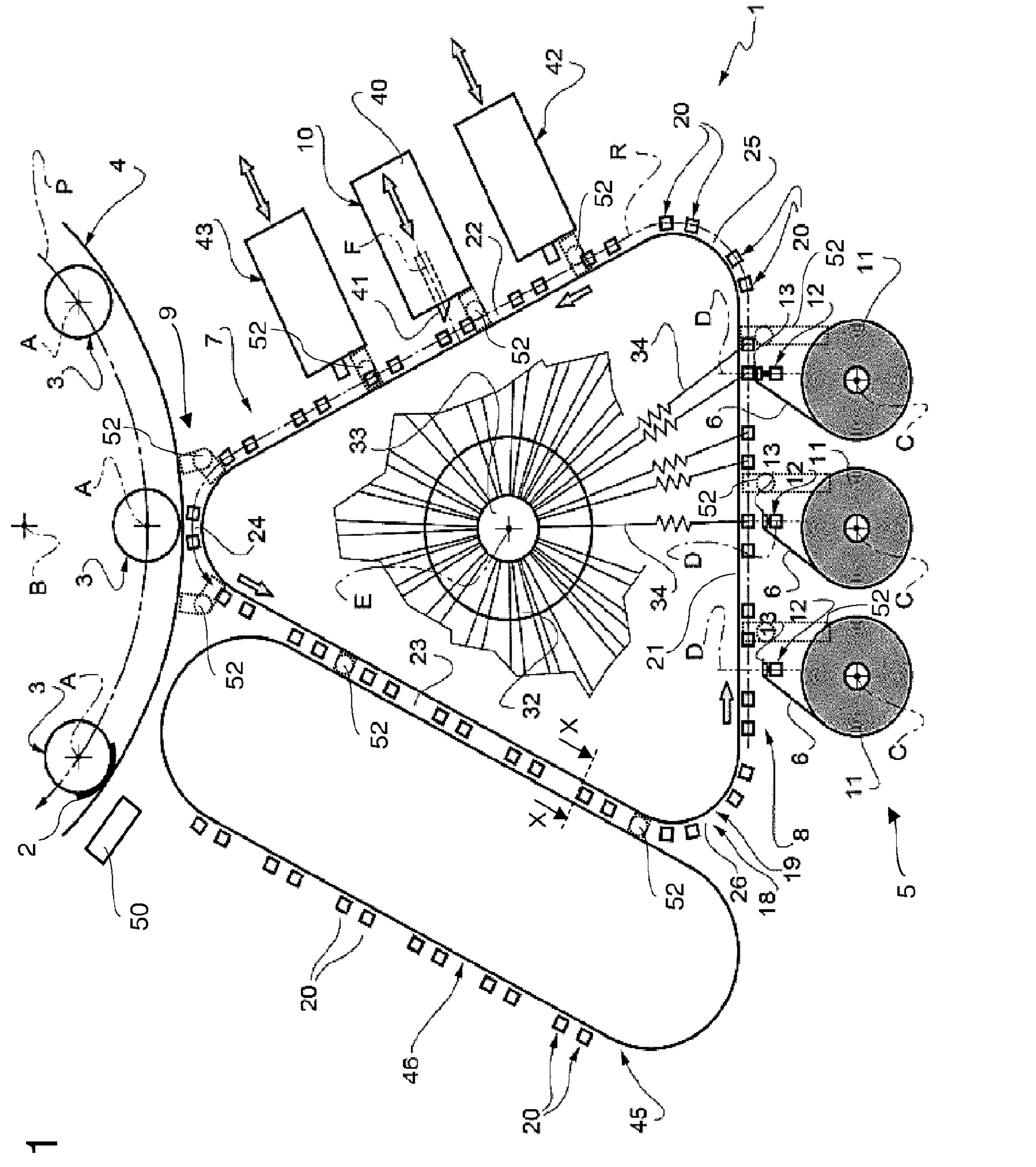
FIG. 1 is a schematic plan view of a device for labeling according to an exemplary embodiment of the present disclosure.

FIG. 1 shows a device 1 for labeling objects 3 with individual labels or label sheets 2 (in FIG. 1, only a single label 2 is drawn on one of the objects 3 for reasons of clarity). The objects 3 are preferably containers, e.g., bottles, cans, canisters, cartons, vials, etc. The objects 3 can each have an axis (vertical axis or longitudinal axis) A. The device 1 can preferably be included in a container treatment facility for liquid media—preferably beverages or liquid foodstuffs. In the container treatment facility, for example, in addition to labeling, the containers can be produced, cleaned, checked, filled, closed, printed, and/or packaged.

The device 1 can have an object conveyor 4 and a label conveyor 7. The device 1 is preferably configured such that it applies the labels 2 to the corresponding objects 3 by transferring the labels 2 from the label conveyor 7 to the objects 3.

The object conveyor 4 can be configured, for example, as a carousel conveyor which moves the objects 3 forwards along a path P. In the example shown, the object conveyor 4 is configured such that it rotates continuously about a respective vertical axis B, perpendicularly to the plane of FIG. 1. The objects 3 are held by object holders of the object conveyor 4. The objects 3 are transported with their axes A parallel to the axis B and moved forwards along a path P. The object conveyor 4 can, for example, have rotary disks for supporting the objects 3 and rotating the objects 3 about the axis A. The path P is defined by a peripheral arc which extends in a horizontal plane about the axis B. It is also possible for the object conveyor 4 to be configured differently, e.g., as a conveyor which extends linearly at least in portions and has, for example, a linear drive, e.g., a long-stator linear drive or a short-stator linear drive, or a planar drive, for moving the objects 3.

The label conveyor 7 is configured to hold the labels 2, move them forwards, and release them. The label conveyor 7 can transfer the labels 2 to the objects 3 in the application region 9. The label conveyor 7 is arranged on one side of the object conveyor 4. In the application region 9, the label conveyor 7 is arranged directly next to the object conveyor 4, so that the labels 2 can be transferred from the label conveyor 7 to each of the objects 3 moved forwards on the object conveyor 4.

The label conveyor 7 preferably has a linear drive 18. The linear drive 18 can be an endless drive or form a closed conveyor track 19. The linear drive 18 has several movement devices (movers or runners) 20. The movement devices 20 are movable along the conveyor track 19. Preferably, the movement devices 20 can be moved by means of magnetically-inductive interaction.

The linear drive 18 is preferably a long-stator linear drive. In the long-stator linear drive, the movement devices 20 are equipped with permanent magnets. Long-stator segments having individually excitable electromagnets 27 (see, for example, FIGS. 5 through 7) are arranged along the conveyor track 19. The movement devices 20 can be moved independently of one another along the conveyor track 19 by actuating or exciting the electromagnets 27 individually.

Alternatively, the linear drive 18 can be configured as a short-stator linear drive. In the short-stator linear drive, the movement devices 20 are equipped with individually excitable electromagnets—the short stators. Permanent magnets are arranged along the conveyor track 19. The movement devices 20 can be moved independently of one another along the conveyor track 19 by the electromagnets thereof being actuated or excited individually.

Instead of the linear drive 18, another drive can also be used. A planar drive can be used, as a particularly preferred alternative. Exemplary embodiments are described herein, for example, with reference to FIGS. 9 through 13. The planar drive has a base element as a conveyor track 19 and also several movement devices 20. The preferably plate-shaped base element can be oriented vertically and parallel to the axes B and C. The movement devices 20 can be moved freely and independently of one another via the base element by means of magnetic interaction with the base element. The movement devices 20 can also be rotated (e.g., yawing) or inclined (e.g., pitching and/or rolling) with respect to the base element, and/or changed in their spacing with respect to the base element, by means of magnetic interaction with the base element. The base element forms a stator of the planar drive. The movement devices 20 form rotors of the planar drive. The movement devices 20 can be carried in a contactless manner by the base element or be supported by rollers on the base element. The base element can have, for example, several electromagnets arranged in a distributed manner, e.g., electrical coils. The movement devices 20 can have permanent magnets. The electromagnets are preferably arranged in a matrix which extends in a plane of the base element (here, preferably the vertical plane). A current supply to the electromagnets of the base element can be controlled as desired, in order to build up electromagnetic fields at a desired position of the base element with a desired field strength. A propulsion, a rotation, an inclination, and/or an uplift of the movement devices 20 can be brought about by corresponding electromagnetic fields of the electromagnets of the base element.

The movement devices 20 can transport the labels 2 from the feed station 8 to the application region 9. Preferably, the movement devices 20 are movable independently of one another along the conveyor track 19. The conveyor track 19 can define a closed magnetic-inductive path R for the movement devices 20. For example, the conveyor track 19 can be horizontal and coplanar with respect to the path P of the object conveyor 4.

Preferably, the conveyor track 19 has a substantially triangular shape. The triangular shape can consist of three straight branches 21, 22, 23, which are connected to one another by three, curved apex portions 24, 25, 26. The branch 22 can be arranged downstream of the feed station 8 and upstream of the application region 9, along the path R. The branch 22 can extend between the apex portions 24 and 25. The branch 23 can extend between the apex portions 24 and 26. The branch 21 can extend between the apex portions 25 and 26. The application region 9 can be arranged on the apex portion 24 of the conveyor track 19. The application region 9 can extend substantially tangentially to the object conveyor 4. The feed station 8 can be arranged on the branch 21, which can lie opposite the apex portion 24 and is preferably also orthogonal to the axes D. A cutting device 10 can be arranged opposite the branch 22. However, it is also possible for the conveyor track 19 to have any other suitable shape, e.g., a rectangular shape.

For example, the movement devices 20 can have a cuboid or disk shape. The movement devices 20 can carry label holders for holding the labels 2. The label holders can hold the labels in any suitable manner, e.g., mechanically, electrostatically, or pneumatically, etc.

For mechanical holding, the label holders can, for example, have at least one movable gripper, e.g., in each case on an upper and lower part (or a front and rear part, or centrally) which hold the respective label 2. The gripper or grippers can be moved for releasing the labels 2 in the application region 9.

For the electrostatic holding, the label holders can be electrostatically charged with one of a negative or positive charge. The labels 2 can be electrostatically charged with the other of a positive or negative charge. In this way, each label 2, which is, for example, part of the web 6 or separated from the web 6 itself, is held on the respective label holder only by static electricity, without the need for suction or mechanical gripping, for example.

However, the label holders preferably hold the labels 2 pneumatically. On end faces of the label holders, connections or openings can be arranged, for example, in a perforated plate, which can alternatively be used to produce suction pressure or overpressure on the web 6 or the label 2.

It is possible for each movement device 20 with its respective label holder to alone hold a label 2 or several labels 2. Alternatively, the movement devices 20 can interact in pairs, for example, in order to hold a label 2 together with their label holders. In other words, each label 2 has a front portion, which is held by the front movement devices 20 of the respective pair, and a rear portion, which is held by the rear movement devices 20 of such a pair.

Optionally, the device 1 can additionally have a label web feed unit 5, a feed station 8, the cutting device 10, a first tank 32, a second tank (concealed by the first tank 32), a printing device 42, an adhesive device 43, a service conveyor 45, and/or a test device 50.

The label web feed unit 5 can transfer a label material web 6 at the feed station 8 to the label conveyor 7. The feed station 8 is spaced apart from the application region 9. The label web feed unit 5 can be arranged on a side, opposite the object conveyor 4, of the label conveyor 7. The label web feed unit 5 can, in the region of the feed station 8, be arranged directly next to the label conveyor 7.

The label web feed unit 5 can have several rolls 11 of the web 6. The rolls 11 can each have separate drives for rotating the rolls 11. The label web feed unit 5 can be arranged opposite the feed station 8 of the label conveyor 7. The respective axes C of the rolls 11 can extend vertically and parallel to the axes A and B. In the example shown, the web 6 is formed by a series of interconnected labels 2. The labels 2 can have, for example, a rectangular, square, or round shape. The labels 2 can be obtained by cutting the web 6, which was originally wound onto a corresponding roll 11, with the aid of the cutting device 10.

The label web feed unit 5 can further have a corresponding feed actuator 12 for each roll 11. The feed actuator 12 can be releasably coupled to a front portion 13 of the corresponding web 6. The feed actuator 12 can be selectively actuated to move towards and away from the label conveyor 7 in order to feed the web 6 to the label conveyor 7 if desired.

Instead of part of the label web feed unit, the feed actuator 12 can be part of a splicing device (not shown), in which a label strip end is connected to a rear label strip end of an (almost) used-up label roll. Alternatively, the splicing device can have its own label holders. Furthermore, the splicing device can have a punch, which presses together and optionally welds the two label webs.

Between the label roll 11 and label conveyor 7, a buffer (not shown) can furthermore be present, in which, in particular, the old label roll can be buffered shortly before it is connected to a new label roll, since a brief standstill time is required for the splicing process, for example. Alternatively or additionally, the buffer can compensate for irregularities in the label uptake speed. In particular, the buffer can be formed by several deflectors around which the label strip is wound, wherein the deflecting rollers are adjustable relative to one another. The buffer can thus constitute what is known as a dancer.

For example, each feed actuator 12 can have a housing and a piston. The housing can be arranged on one side of the respective roll 11. The piston can be moved through the housing in the direction of the feed station 8 of the label conveyor 7 and away from it, or moved back and forth along a respective horizontal axis D, which extends orthogonally to the axes A, B, C. During operation, the feed actuators 12 can be selectively actuated in order to transfer the webs 6, unwound from the respective rolls 11, to the feed station 8 of the label conveyor 7. Each piston can have a plate at its free axial end. The plate may be provided with a plurality of openings that can be selectively connected to a vacuum source, in order to retain the front portion 13 of the respective web 6 of the label material during transfer from the respective roll 11 to the feed station 8 of the label conveyor 7. During the transfer of a web 6 to the label conveyor 7, a release of the front portion 13 of the web 6 can be achieved by simply interrupting the connection of the openings of the respective plate to the vacuum source.

The cutting device 10 can be configured to cut the web 6 of the label material, which is held by the label conveyor 7, into individual labels 2. The cutting device 10 can be arranged, for example, at a position relative to the branch 22 of the conveyor track 19, i.e., for example, in a position between the feed station 8 and the application region 9. The cutting device 10 can have, for example, a housing 40 and a blade 41. The blade 41 can be moved through the housing 40 along an axis F extending orthogonally to the branch 22. The blade 41 can cut the web 6 into individual labels 2.

It is also possible for the labels 2 to be transferred directly to the label conveyor 7 as individual sheets (and thus not as a web 6).

The first tank 32 can be annular and rotatable. The first tank 32 can be connected to a vacuum source (not shown), such as a vacuum pump. The first tank 32 can be connected to a first rotatable distributor 33. The first distributor 33 can be connected, on the one hand, to the first tank 32 and the vacuum source and, on the other, to each label holder carried by the movement devices 20, by a respective fluid line 34. The fluid line 34 can be configured, for example, at least in portions, as a resilient and/or flexible hose. The fluid line can have an ON/OFF valve (shut-off valve) in order to enable or to prevent the connection of the respective label holder to the first distributor 33.

The second tank can be annular and rotatable. The second tank can, for example, be arranged below the first tank 32, and is therefore also concealed in FIG. 1. The second tank can be connected to a compressor (not shown). The second tank can be connected to a second rotatable distributor. The second distributor can be connected, on the one hand, to the second tank and the compressor and, on the other, to each label holder, carried by the movement devices 20, by a respective fluid line. The fluid line can be configured, for example, at least in portions as a resilient and/or flexible hose. The fluid line can have an ON/OFF valve (shut-off valve) in order to enable or to prevent the connection of the respective label holder to the second distributor.

The first tank 32, the second tank, the first distributor 33, and the second distributor can all be mounted rotatably about a common vertical axis E parallel to the axes A, B, and C. In addition, the first tank 32, the second tank, the first distributor 33, and the second distributor can be arranged essentially in the central region delimited by the conveyor track 19 and stacked on top of one another.

The printing device 42 can be configured for printing on the labels 2 or the web 6—for example, with predetermined patterns, barcodes, decoration, and/or best-before date, etc.

The adhesive device 43 can be configured to apply glue to the labels 2. The adhesive device 43 can, for example, be a glue atomizer, a glue roller, or what is known as a Gluejet. It is also possible that, for example, self-adhesive labels 2 be used, and therefore no adhesive device 43 be included.

In the exemplary embodiment of FIG. 1, the printing device 42, the cutting device 10, and the adhesive device 43 are all arranged next to one another in series on the branch 22 of the conveyor track 19. Preferably, the cutting device 10 can be arranged between the printing device 42 and the adhesive device 43, wherein the printing device 42 is connected upstream of the others.

The service conveyor 45 can have a closed operating circuit. The service conveyor 45 can be arranged laterally with respect to the label conveyor 7—for example, in front of the branch 23 of the conveyor track 19. The service conveyor 45 can be configured to selectively receive movement devices 20 from the label conveyor 7 for cleaning and/or maintenance, and/or to selectively replace movement devices 20 by movement devices 20 of another type, in the event of a change in the label format.

The service conveyor 45 is preferably of the same type as the label conveyor 7—for example, having a long-stator linear drive or a short-stator linear drive. The service conveyor 45 can have a closed conveyor track 46 which can be equipped with a plurality of individually excitable magnets or permanent magnets. The conveyor tracks 19 and 46 can share the branch 23, along which it is possible to exchange the movement devices 20 between the tracks 19 and 46—for example, when the labeling is stopped or during operation. It is possible that, in the case of a change in the label format, by suitable control and operation of the conveyors 7, 45, the currently used movement devices 20 be replaced by other movement devices 20 which are suitable for the new label format. It is also possible for the label holders to be configured to hold different label formats. If the drive of the label conveyor 7 is configured as a planar drive, it is possible, for example, to dispense with the service conveyor 45, and instead to consider an extension of the base element for parking, maintaining, cleaning, etc., of the movement devices 20.

The test device 50 can carry out an optical check with regard to a correct attachment of the labels 2 on the objects 3. The correct attachment can include correct positioning and/or correct alignment of the labels 2 on the objects 3. The test device 50 can have, for example, a camera and an image recognition system. The camera can be directed towards a portion of the object conveyor 4 downstream of the application region 9. Depending upon the optical check by the test device 50, the object holders of the object conveyor 4 and/or the label holders of the label conveyor 7 can be moved upstream of the application region 9, in order to enable the correct attachment of the labels 2 in the case of subsequent objects 3.

An operation of the device 1 is described below with reference to FIG. 1. The described operation is purely by way of example and can be modified according to the configuration and equipment of the device 1.

The web 6 of one roll 11 is fed to the label conveyor 7 at the feed station 8, while the webs 6 of the other rolls 11 are kept separate from the feed station 8. In this state, the piston 15 of the feed actuator 12, which carries the web 6 to be fed to the label conveyor 7, is brought along its axis D into a forwards-moved position. In this position, the respective plate thereof brings the front portion 13 of the web 6 into contact with a selected label holder carried by a movement device 20. The pistons 15 of the other feed actuators 12 are coupled to the respective front portions 13 of the other webs 6 and are all held in retracted positions along their axes D. In these, their plates are spaced apart from the path R. When the front portion 13 of the selected web 6 contacts the selected label holder, the connection of the connectors of the respective plate to the vacuum is interrupted, while the connection of the label holder to the vacuum source is activated by opening the ON/OFF valve on the fluid line.

In this way, the front portion 13 of the selected label web 6 is slid together along the conveyor track 19 and the path R by the respective movement device 20. The label web 6 is thus unwound continuously from the respective roll 11 and moved forwards to the application region 9.

Each label 2, which forms the web 6 in use, adheres gradually, e.g., at its front and rear parts, or centrally, to the respective label holders carried by the movement devices 20, and can hold the label 2 by, for example, suction action through the respective openings.

On the path R, the web 6 is first printed on each label 2 with predetermined patterns and/or barcodes by the printing device 42. The web 6 is then cut into individual labels 2 along the axis F by moving the blade 41 of the cutting device 10 back and forth. The labels 2 are then wetted, e.g., sprayed, with glue by the adhesive device 43.

Each label 2 is subsequently, in the application region 9, detached from the respective label holder and the respective direction of movement 20 and applied to a corresponding object 3 by gradually removing the vacuum and activating the overpressure on the label 2. By controlling the corresponding ON/OFF valves, the vacuum on each label holder is gradually cut off, and the overpressure is gradually activated, in order to enable the transfer of the corresponding label 2 to the corresponding object 3, which is simultaneously moved forwards on the object conveyor 4 and in the process preferably rotates about its axis A.

The movement devices 20 which have already released the respective label 2 can be controlled in such a way that they move on the conveyor track 19 faster than the movement devices 20 still equipped with the labels 2, until they again reach the feed station 8.

The movement devices 20 which have to be replaced, cleaned, or maintained are selectively guided via the common branch 23 to the service conveyor 45. In this particular state, the movement devices 20 in operation can be preemptively separated from the corresponding fluid lines (inter alia, 34). The new or cleaned movement devices 20, which run on the conveyor track 19, can be connected to these fluid lines (inter alia, 34) before the start of the labeling.

When the roll 11 in operation is used up, the labeling can be continued by simply activating one of the other feed actuators 12, in order to feed the front portion 13 of the respective web 6 to a selected movement device 20 or the label holder supported thereby.

A special feature of the device 1 is that it can be constructed in a modular manner. The label conveyor 7 can have several module docking stations 52. The label web feed unit 5, the printing device 42, the cutting device 10, the adhesive device 43, the object conveyor 4, and/or the service conveyors 45 can be configured as auxiliary unit modules which, if desired, can be connected to or detached from the several module docking stations 52. The auxiliary unit modules can be moved, for example, by means of rollers over a floor or a foundation of the facility.

The module docking stations 52 can be arranged on an inner peripheral side and/or an outer peripheral side with respect to the conveyor track 19. In the exemplary embodiment of FIG. 1, all module docking stations 52, for example, are arranged on the outer peripheral side with respect to the conveyor track 19.

The module docking stations 52 can have mechanical and/or electrical connectors. By means of the mechanical connector, the respective auxiliary unit module can be fixedly attached to the label conveyor 7. An energy transmission (e.g., in the form of electrical current) and/or a signal transmission (e.g., for control signals) between the respective auxiliary unit module and the label conveyor 7 can be made possible by means of the electrical connector.

It is possible for the module docking stations 52 to be identical at least in part, so that the auxiliary unit modules can selectively be connected to each of the identically-configured module docking stations 52. For example, an arrangement and/or an order of the auxiliary unit modules can thus be changed (e.g., printing device 42 before or after cutting device 10). For example, each of the module docking stations 52 can have at least two module docking points spaced apart from one another.

Figure 2:
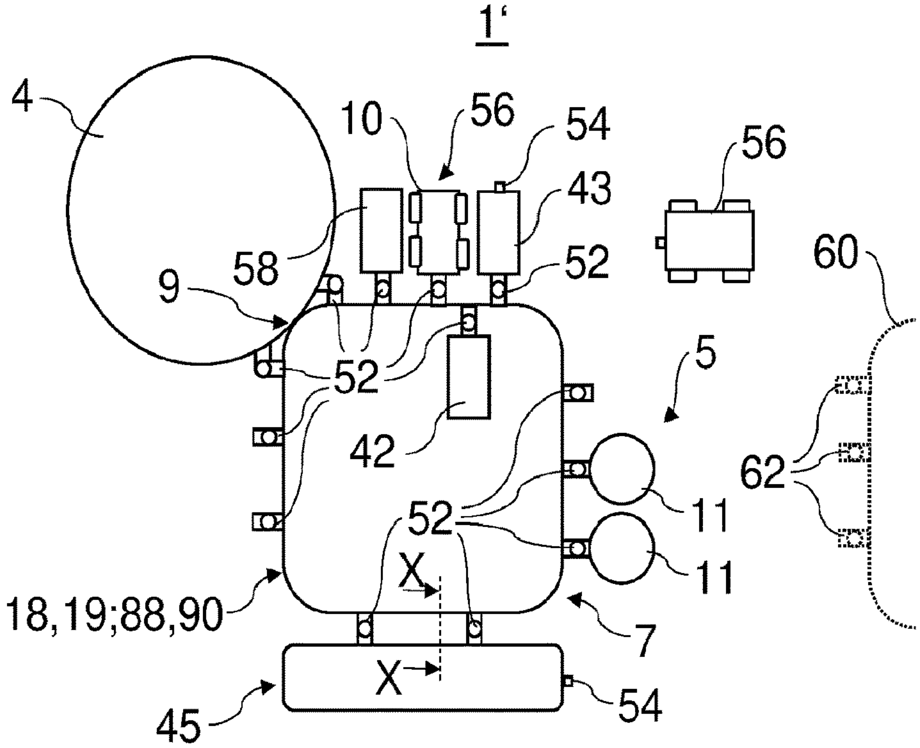
FIG. 2 is a schematic plan view of a device for labeling according to an exemplary embodiment of the present disclosure.

FIG. 2 shows a device 1', the technical features of which can be combined with those of the device 1 of FIG. 1, individually or in any combination with one another. In the following, the device 1' of FIG. 2 is described in particular with regard to differences from the device 1 of FIG. 1. For reasons of clarity, the device 1' of FIG. 2 is shown in less detail than the device 1 of FIG. 1. For example, the movement devices 20 are not shown.

In a plan view of the device 1', the conveyor track 19 of the label conveyor 7 has a rectangular shape, and preferably a square shape. Several module docking stations 52 are arranged on each peripheral side of the rectangular shape.

The printing device 42 is arranged on an inner peripheral side with respect to the conveyor track 19. The printing device 42 can thus print a front side of the label 2 (see also explanations regarding FIG. 3). The printing device 42 can be configured, for example, as an inkjet printing device or a laser printing device.

It is possible for at least one auxiliary unit module to have a coupling 54 for coupling to an automated guided vehicle 56 of the device 1'. Purely by way of example, in FIG. 2, the adhesive device 43 and the service conveyor 45 each have a coupling 54.

It is also possible for at least one auxiliary unit module to be configured as an automated guided vehicle 56 or be comprised in an automated guided vehicle 56. Purely by way of example, in FIG. 2, the cutting device 10 is configured as an automated guided vehicle 56.

As an additional auxiliary unit module, the device 1' has an optional camera device 58, which is connected to one of the module docking stations 52. The camera device 58 is preferably arranged upstream of the application region 9 and downstream of the cutting device 10, the adhesive device 43, and/or the printing device 42. By means of the camera device 58, the labels 2 and/or the movement devices 20, for example, can be optically checked —preferably by means of automatic image recognition. For example, the label 2 can be optically checked for presence, positioning, alignment, application of adhesive, and/or printing, and control measures can optionally be taken in response to the results of the optical check.

Optionally, the device 1' can have a further label conveyor 60—for example, as part of the same or another container treatment facility. The further label conveyor 60 can also have several further module docking stations 62, which can be configured like the module docking stations 52. The auxiliary unit modules can thus be connected either to the label conveyor 7 or to the further label conveyor 60, depending upon the need. The auxiliary unit modules can be moved back and forth between the label conveyors 7 and 60. The auxiliary unit modules can selectively be connected to one of the several module docking stations 52 and the several further module docking stations 62.

Figure 3:
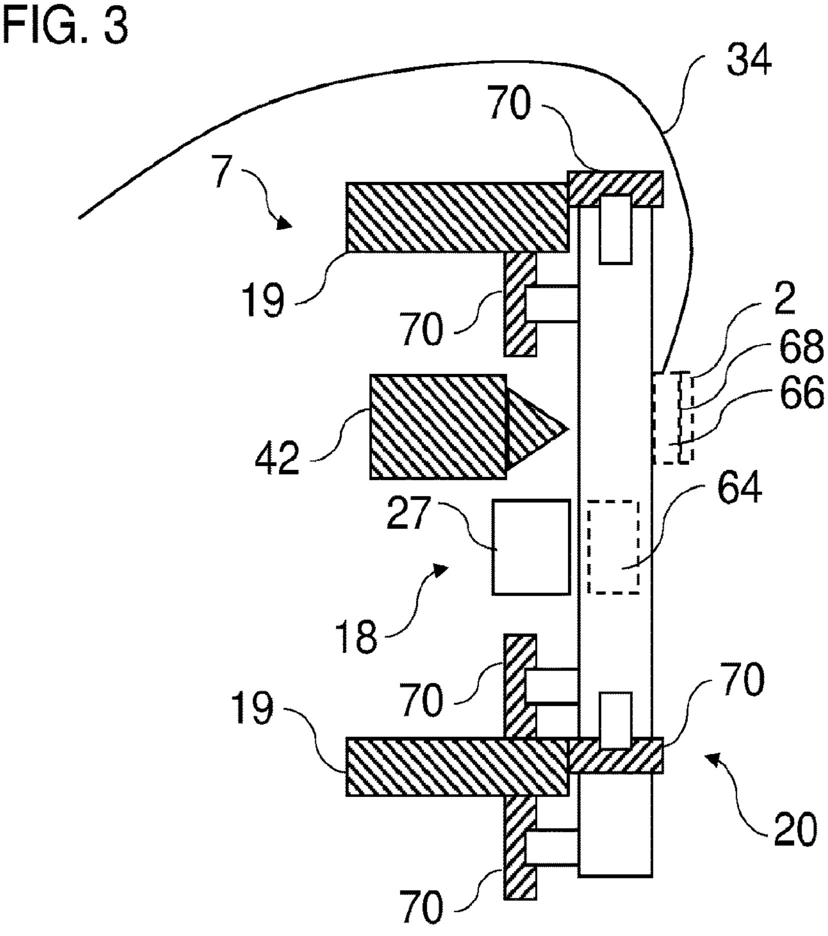
FIG. 3 is a sectional view through a label conveyor and a printing device of a device for labeling according to an exemplary embodiment of the present disclosure.

FIG. 3 shows a section through the conveyor track 19 in the region of a printing device 42.

In the exemplary embodiment shown, the label conveyor 7 has a linear drive 18 having several movement devices 20 (only one shown in FIG. 3). The linear drive 18 is preferably configured as a long-stator linear drive, in which electromagnets 27 arranged in series drive or move the movement devices 20 in magnetic interaction with permanent magnets 64 of the movement devices 20. However, the linear drive 18 can also be configured as a short-stator linear drive, for example.

The movement devices 20 each carry a label holder 66 for holding the label 2 by means of suction. The label 2 can be sucked in by means of a perforated plate 68 of the label holder 66. For example, the perforated plate 68 can be connected to the fluid line 34. For example, the perforated plate 68 can be curved or flat. The perforated plate 68 is to be understood as an example of a pneumatic holder for holding the label 2, which can also be configured differently from the perforated plate 68, as long as it enables, for example, a direct pneumatic suction and/or ejection of the label 2.

One special feature of the present disclosure is that the movement devices 20 can be guided and supported along the conveyor track 19 by means of rotatable rollers (or wheels) 70. The conveyor track 19 can have several conveyor track portions or guide rails arranged in parallel above one another or next to one another, along which the movement devices 20 are moved and supported. The support by the rollers 70 makes it possible —particularly in the application region 9—for the labels 2 to be applied to the objects 3 with a force.

In this case, it has been found to be particularly advantageous if one roller 70 is arranged above the label holder 66, and one roller 70 underneath the label holder 66. Alternatively or additionally, a roller 70 can be arranged such that a pressing torque which arises when the label 2 is pressed onto the object 3 can be supported on the conveyor track 19. Alternatively or additionally, one roller 70 can be arranged in front of the label holder 66 with respect to a forward movement direction of the respective movement device 20, and one roller 70 can be arranged behind the label holder 66 with respect to the forward movement direction.

One special feature of the present disclosure is that the printing device 42 can be arranged on an inner peripheral side with respect to the conveyor track 19.

Although the label holder 66 (and thus the label 2) and the printing device 42 are arranged on opposite sides with respect to the movement device 20, the printing device 42 can nevertheless print a front side (=side facing the label holder 66). As already explained with reference to FIG. 1, it is possible for the label 2 to be held and transported by a pair of movement devices 20 or the label holders 66 thereof. The label holder 66 of the front movement device 20 holds a front portion of the label 2. The label holder 66 of the rear movement device 20 holds a rear portion of the label 2. A middle portion of the label 2 is thus free and not concealed by the front and rear movement device 20 when printing from the inner peripheral side. The printing device 42 can print the middle portion of the label 2. During printing of the labels 22, the printing device 42 prints through a passage in the conveyor track 19. Furthermore, this technique also works in the case of printing of the label web 6 when this is held only in mutually-spaced portions of label holders 66 of the movement devices 20.

Figure 4:
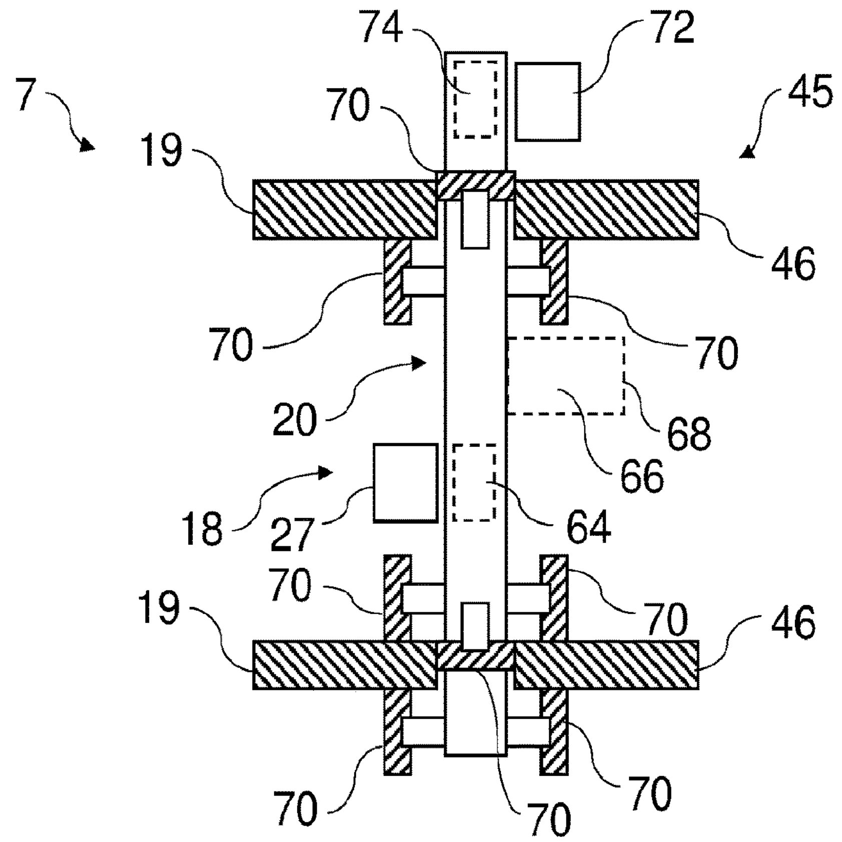
FIG. 4 is a sectional view through a label conveyor and a service conveyor of a device for labeling according to an exemplary embodiment of the present disclosure.
Figure 5:
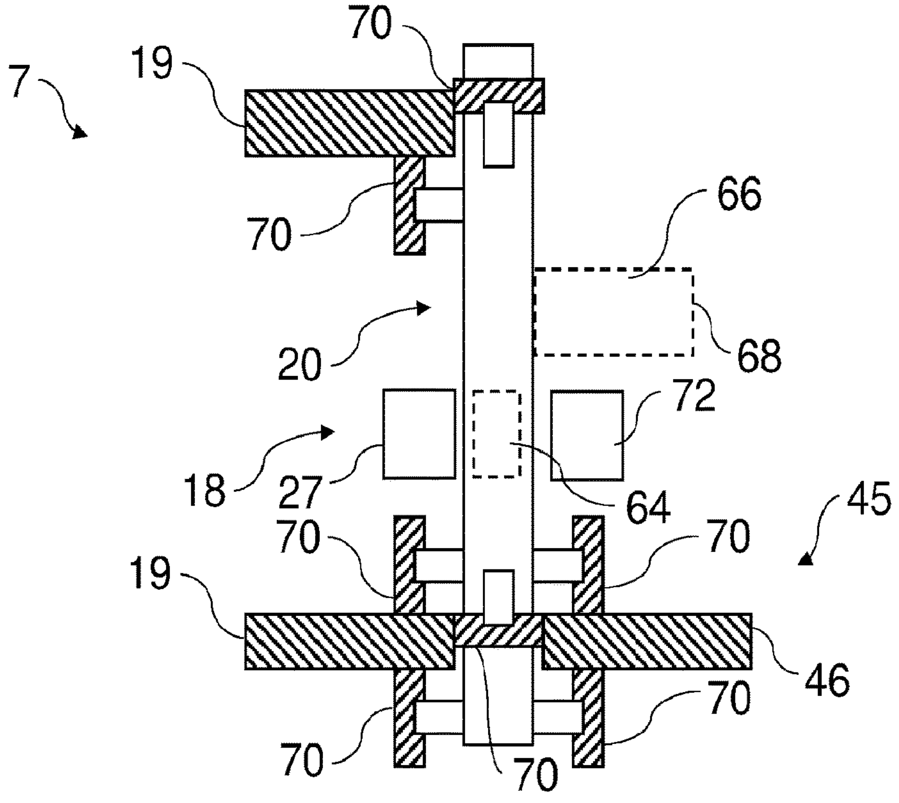
FIG. 5 is a sectional view through a label conveyor and a service conveyor of a device for labeling according to an exemplary embodiment of the present disclosure.

With reference to FIGS. 4 and 5, a special feature of the present disclosure is explained, which consists in the movement devices 20 being able to be driven and/or supported less strongly by the service conveyor 45 compared to the label conveyor 7. The technical features of FIGS. 4 and 5 can be combined with one another. FIGS. 4 and 5 are each sectional views of a region of the device 1 or 1' in which the service conveyor 45 and the label conveyor 7 are connected to one another, as shown purely schematically in FIGS. 1 and 2, for example, along the line X-X in each case.

FIG. 4 shows one of the electromagnets 72, arranged in series, of a long stator of a linear drive of the service conveyor 45. The long stators of the service conveyor 45 and the label conveyor 7 are arranged on opposite sides of the direction of movement 20. The long stator of the service conveyor 45 is arranged eccentrically with respect to the guide track 46 of the service conveyor 45. The long stator of the service conveyor 45 is preferably arranged above or below the guide track 46 of the service conveyor 42. The long stator of the service conveyor 45 is vertically offset with respect to the electromagnets 27, arranged in series, of the long stator of the linear drive 18 of the label conveyor 7. The movement devices 20 have further permanent magnets 74, by means of which the movement devices 20 can be driven and moved along the guide track 46 of the service conveyor 45 in magnetic interaction with the electromagnets 72 of the long stator of the service conveyor 45. The permanent magnets 74 are vertically offset relative to the permanent magnets 64.

FIG. 5 shows that the guide track 46 of the service conveyor 45 can have fewer guide rails, arranged one above the other, for supporting the movement devices 20 than the guide track 19 of the label conveyor 7. As shown, the guide track 46 of the service conveyor 45 can have, for example, only one guide rail. However, the guide track 19 of the label conveyor 7 can have two guide rails, for example.

Figure 6:
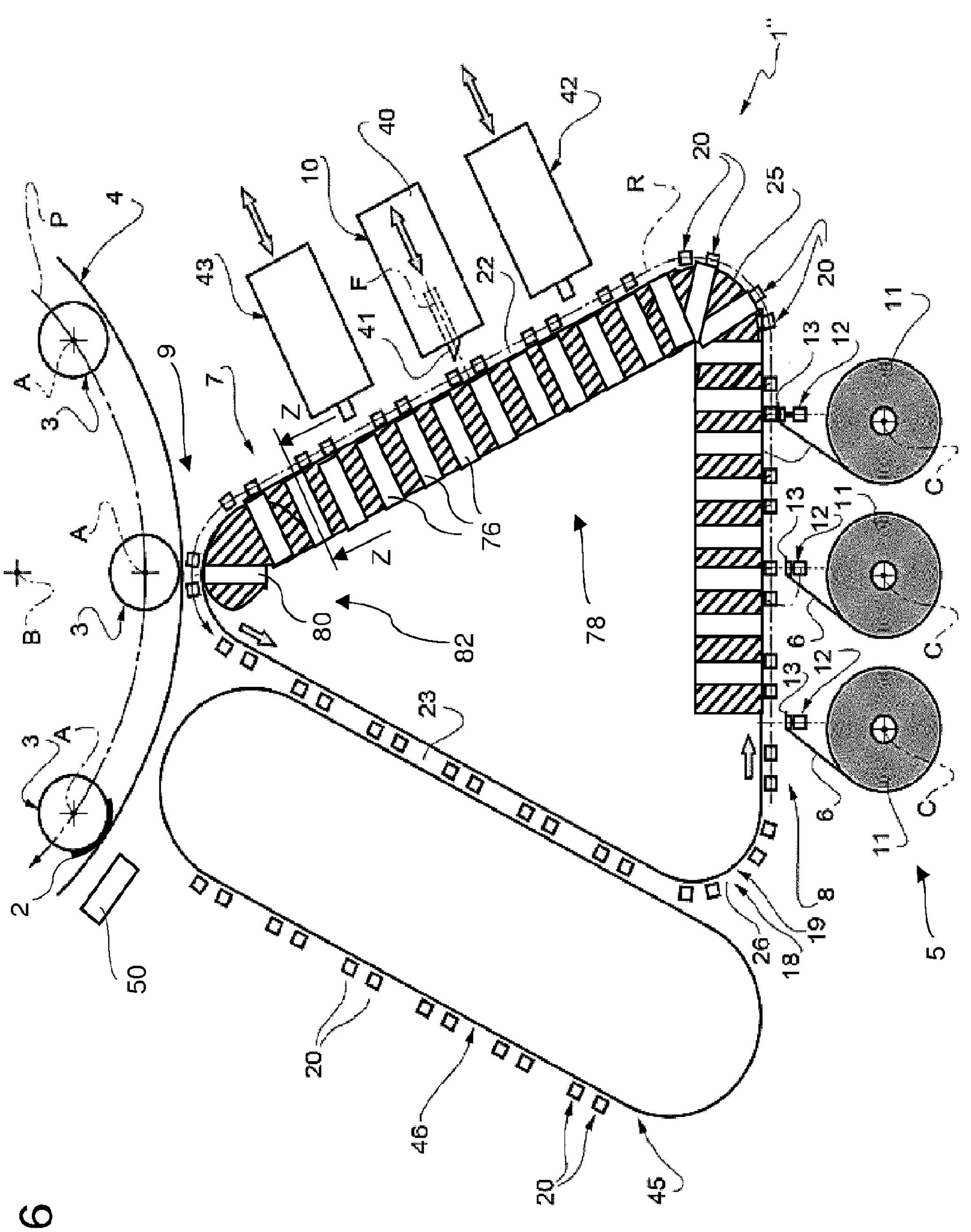
FIG. 6 is a schematic plan view of a device for labeling according to an exemplary embodiment of the present disclosure.
Figure 7:
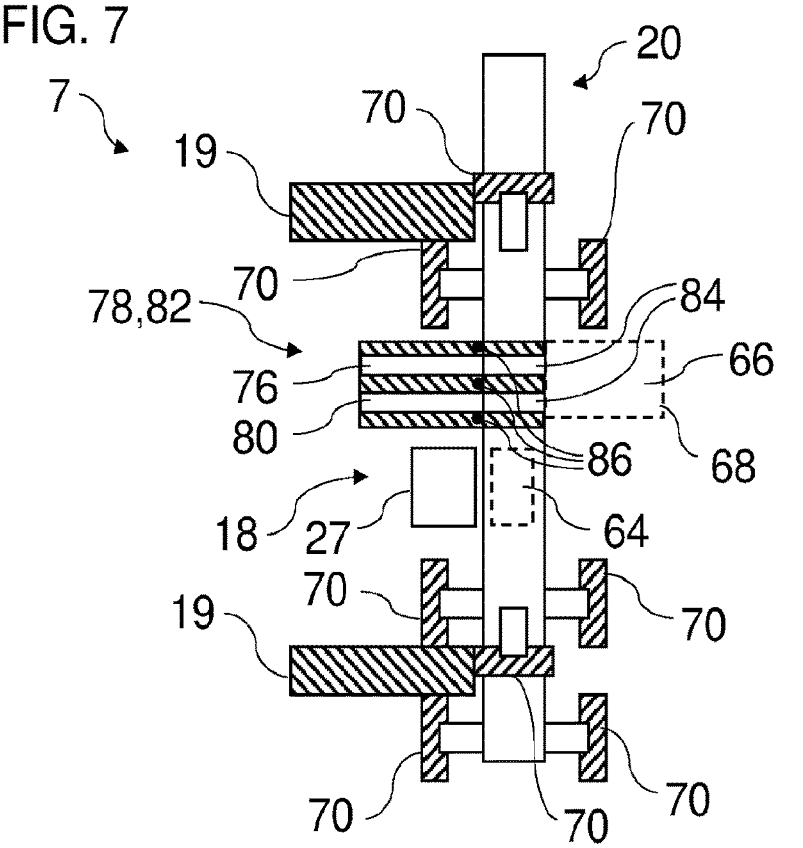
FIGS. 7 and 8 are sectional views along a line Z-Z in FIG. 6, according to several exemplary embodiments of the present disclosure.
Figure 8:
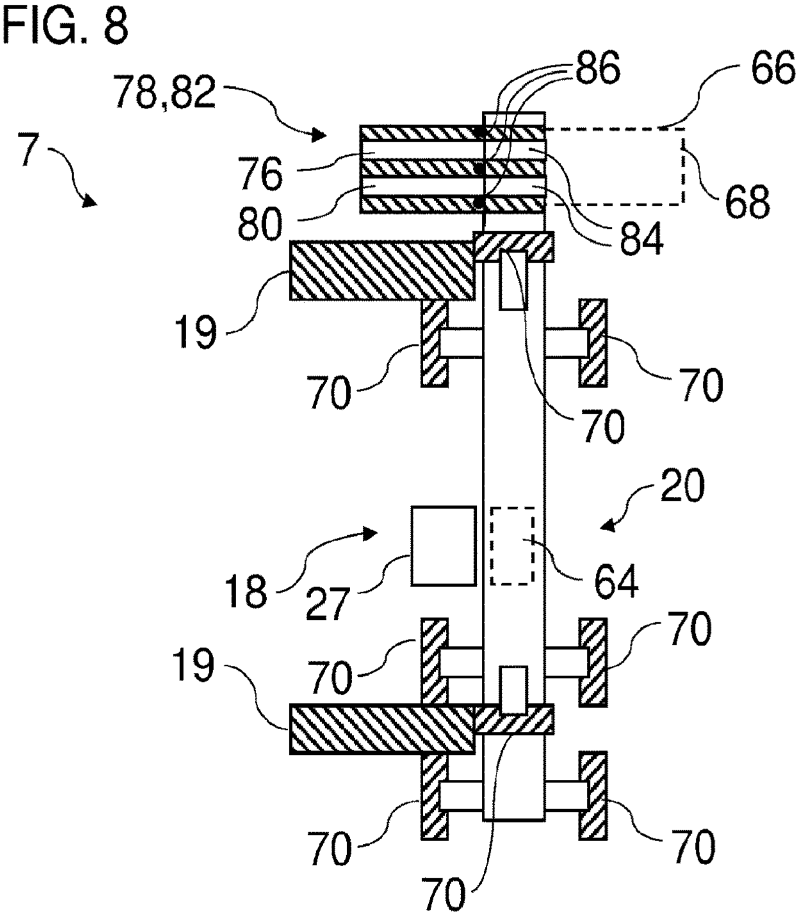

FIG. 6 shows a further device 1" for labeling objects, which is a modification of the device 1 of FIG. 1. FIGS. 7 and 8 show, purely schematically, sections along the line Z-Z of FIG. 6.

A special feature of the device 1" is the pneumatic system of the label conveyor 7. The suction lines 76 of a suction line system 78 and/or at least one pressure line 80 of a compressed air line system 82 can be arranged in a stationary/fixed manner (in contrast to the rotatable fluid lines (inter alia, 34) of the exemplary embodiment of FIG. 1). The inlet of the suction lines 76 or the suction line system 78 can be stationary. The outlet of the at least one pressure line 80 or of the compressed air line system 82 can also be stationary. The inlet and the outlet can be configured, for example, as several openings, slits, etc., arranged in series. The compressed air line system 82 can be connected to a compressor. The suction line system 78 can be connected to a vacuum source—to a vacuum pump.

The inlet of the suction line system 78 and/or the outlet of the compressed air line system 82 can be arranged along an entire periphery of the label conveyor 7 or the conveyor track 19. However, it is preferred that the outlet of the compressed air line system 82 be arranged only in the application region 9. It is also preferred that the inlet of the suction line system 78 be arranged only in a region between the label web feed unit 8 and the application region 9, along a periphery of the conveyor track 19 or the label conveyor 7.

FIGS. 7 and 8 show, purely schematically, both a suction line 76 and a pressure line 80, wherein it is pointed out that the pressure line 80 can actually be arranged only in the application region 9 (see FIG. 6)—for example, at the level of the suction lines 76 arranged upstream thereof.

FIGS. 7 and 8 show, by way of example, that a fluid connection between the inlet of the suction line system 78 or the outlet of the compressed air line system 82 and the label holders 66, which are carried by the movement devices 20, can be achieved by means of sliding contact.

The movement devices 20 can each have at least one fluid line 84. The at least one fluid line 84 can in sliding contact with the inlet of the suction line system 78 and/or the outlet of the compressed air line system 82 establish a fluid connection to the perforated plate 68 of the label holder 66. The at least one fluid line 84 can extend between the inlet/outlet of the systems 78/82 to a rear side of the perforated plate 68. The at least one fluid line 84 can extend transversely through the movement device 20 with respect to the forward direction of travel of the movement device 20. Particularly preferably, the at least one fluid line 84 can extend transversely through the movement device 20, from a rear side of the respective movement device 20, for contacting the inlet/outlet of the systems 78/82, to a front side of the respective movement device 20 for connection to a rear side of the perforated plate 68.

The sliding contact can be sealed by a sliding seal 86. The sliding seal 86 can be arranged in a stationary manner on the inlet of the suction line system 78 and/or the outlet of the compressed air line system 82. Alternatively or additionally, it is possible that the movement devices 20 each carry a sliding seal 86.

It is possible for the at least one fluid line 84 to have a suction line for sliding connection to the inlet of the suction line system 78, and a pressure line for sliding connection to the outlet of the compressed air line system 82. Alternatively, simply a combined suction-pressure line can form the fluid line 84 and be connected both to the inlet of the suction line system 78 and the outlet of the compressed air line system 82 by means of sliding contact.

The suction lines 76 and/or the at least one pressure line 80 are preferably valve-free. A respective pneumatic control can already be possible in a slot-controlled manner by the respective arrangement and dimensioning (length) of the inlet of the suction line system 78 and the outlet of the compressed air line system 82.

Depending upon the embodiment, the inlet and/or the outlet can be arranged above (see FIG. 8), below, or at the height of (see FIG. 7) the conveyor track 19 of the label conveyor 7.

Figure 9:
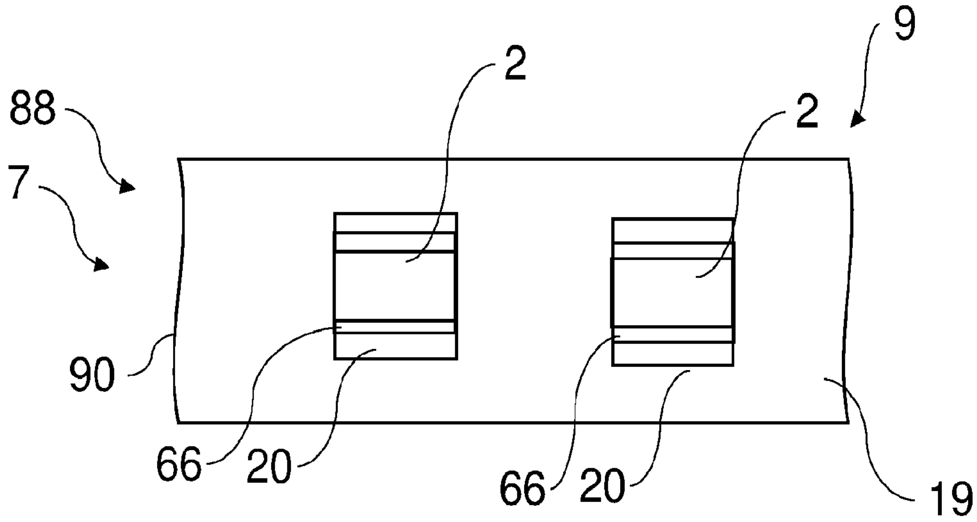
FIGS. 9-13 show various views of an application region of a device for labeling according to several exemplary embodiments of the present disclosure.

FIG. 9 is a side view of a portion of the label conveyor 7 upstream of and in the application region 9.

A special feature of the exemplary embodiment shown is that the label conveyor 7 can have a planar drive 88 having a vertically-oriented base element 90 and several movement devices 20 (only two shown in FIG. 9). The base element 90 simultaneously forms the conveyor track 19. The movement devices 20 carry the label holders 66.

Figure 10:
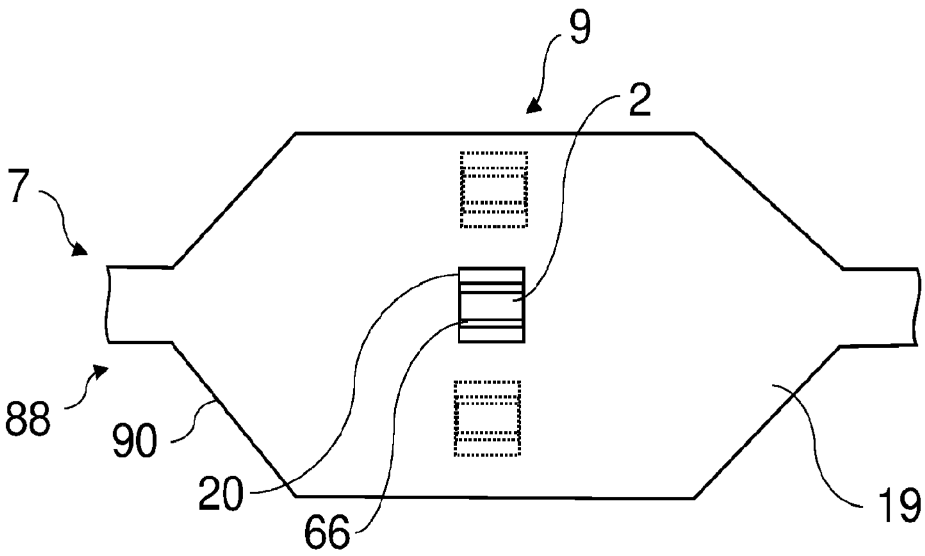

FIG. 10 is a side view of a portion of the label conveyor 7 upstream of, in, and downstream of the application region 9. FIG. 10 shows an optional addition for exemplary embodiments in which the label conveyor 7 has the planar drive 88.

Optionally, the base element 90, in the application region 9, can have an enlarged vertical extension or height in comparison to the portions of the base element 90 arranged upstream and downstream. The movement devices 20 can thus be moved at different heights over the base element 90 in the application region 9—for example, according to the object format or attachment position of the label 2 held in each case.

Figure 11:
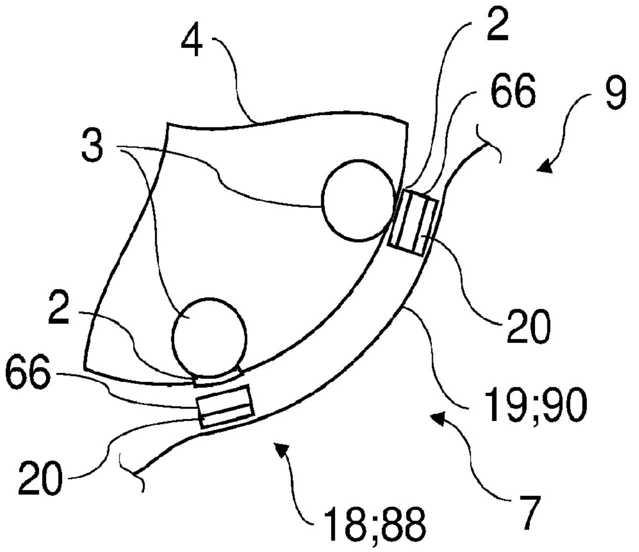

FIG. 11 is a plan view of the application region 9. FIG. 11 shows an optional addition for exemplary embodiments in which the label conveyor 7 has the linear drive 18 or the planar drive 88.

The object conveyor 4 can be configured as a rotatable conveyor carousel. In the application region 9, the label conveyor 7 extends in an arcuate manner over a longer portion, along an arcuate portion of the conveyor carousel—preferably with respect to an imaginary horizontal plane. The conveyor track 19 or the base element 90 extends in this portion in an arcuate manner and at a substantially constant distance from the arcuate portion of the conveyor carousel.

Figure 12:
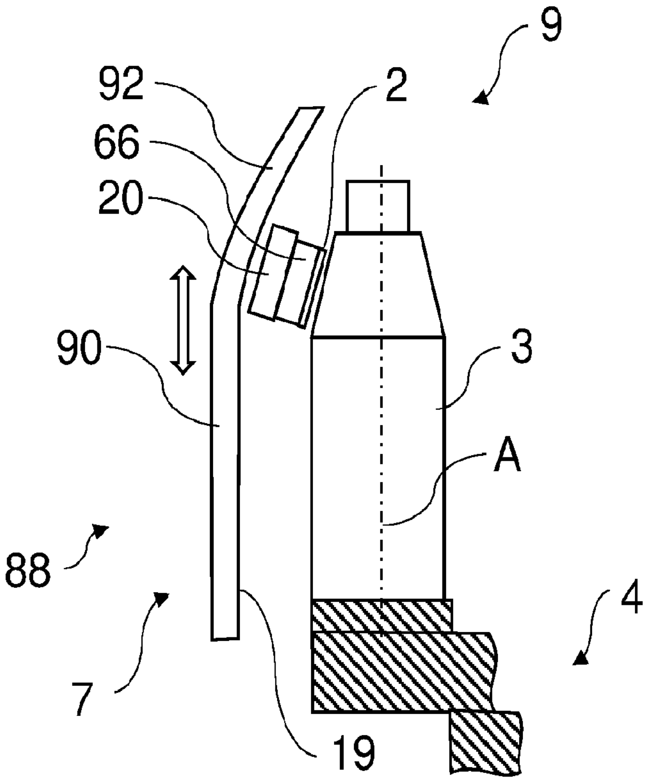

FIG. 12 is a sectional view through an application region 9. FIG. 12 shows an optional addition for exemplary embodiments in which the label conveyor 7 has the planar drive 88.

The base element 90 has an upper portion 92 in the application region 9. The upper portion 92 is curved towards the object conveyor 4—preferably in a uniformly arcuate manner and/or perpendicularly to the vertical alignment plane of the base element 90 with respect to an imaginary vertical plane. If the movement devices 20 are moved through the application region 9 along the upper curved portion 92, the labels 2 can be applied to, for example, conical object portions of the objects 3.

It is possible for the base element 90 to be height-adjustable, at least in the application region 9. It can thus be achieved that a height position of the upper curved portion 92 be able to be changed, for adapting to different object formats.

Figure 13:
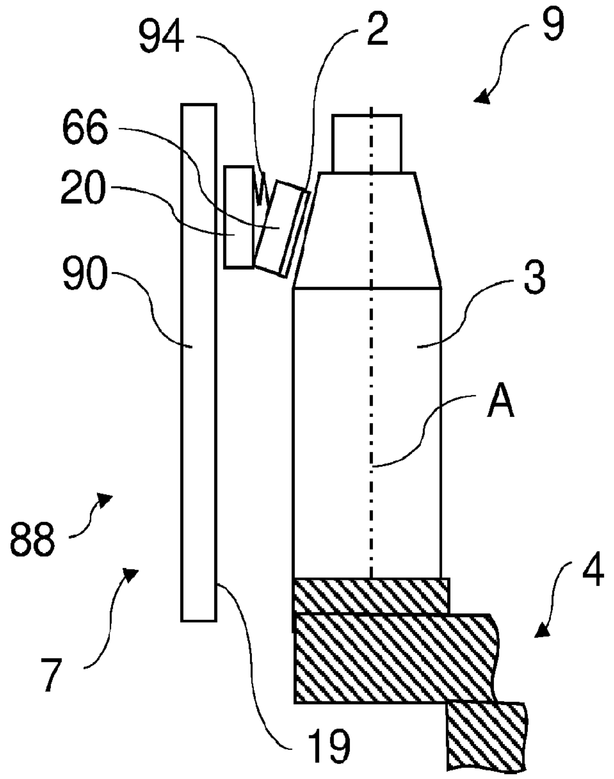

FIG. 13 is a sectional view through an application region 9. FIG. 13 shows an optional addition for exemplary embodiments in which the label conveyor 7 has the planar drive 88.

The movement devices 20 can each carry a setting device 94. The setting device 94 can carry the respective label holder 66. The setting device 94 can be configured, for example, as an actuator—for example, an electromagnet. The setting device 94 can change an angle of incidence of the label holder 66 (and thus of the label 2) with respect to the respective movement device 20. In other words, the setting device 94 can rotate the label holder 66 about a current direction of movement of the respective movement device 20. The movement device 20 can, with the label holder 66, which is set as desired, pass through the application region 9, for applying the held label 2 to a conical object portion of the object 3.

Alternatively or additionally, it is also possible for a control unit to be configured to operate the several movement devices 20, upstream of the application region 9, for rotating about a longitudinal axis of the respective movement device 20 with respect to the current direction of movement of the respective movement device 20. In other words, the movement devices 20 can be rotated, upstream of the application region 9, about a roll axis, in order to change an angle of incidence of the movement device 20 (and thus of the label holder 66 and the label 2) with respect to the alignment plane of the base element 90. In the aligned orientation with respect to the base element 90, the movement devices 20 can pass through the application region 9 for applying the held label 2 to a conical object portion of the object 3.

It should be noted that the techniques disclosed herein as special features are each disclosed individually and independently of one another. The techniques disclosed herein as special features may also be used in any combination with one another.

The invention is not limited to the preferred exemplary embodiments described above. Rather, a plurality of variants and modifications are possible which likewise make use of the inventive concept and therefore fall within the scope of protection. In particular, the invention also claims protection for the subject matter and the features of the dependent claims, irrespective of the claims to which they refer. In particular, the individual features of independent claim 1 are each disclosed independently of one another. In addition, the features of the dependent claims are also disclosed independently of all of the features of independent claim 1 and, for example, independently of the features relating to the presence and/or the configuration of the object conveyor, the label conveyor, the application region, the at least one auxiliary unit module, and/or the several module docking stations of independent claim 1.

LIST OF REFERENCE SIGNS

1 Device for labeling
2 Label
3 Object
4 Object conveyor
5 Label web feed unit
6 Label material web
7 Label conveyor
8 Feed station
9 Application region
10 Cutting device
11 Roll
12 Feed actuator
13 Front portion
18 Linear drive
19 Conveyor track
20 Movement device
21 Branch
22 Branch
23 Branch
24 Apex portion
25 Apex portion
26 Apex portion
27 Electromagnet
32 Tank
33 Distributor
34 Fluid line
35 Housing
41 Blade
42 Printing device
43 Adhesive device
45 Service conveyor
46 Conveyor track
50 Test device
52 Module docking station
54 Coupling
56 Automated guided vehicle (AGV)
58 Camera device
60 Further label conveyor
62 Further module docking station
64 Permanent magnet
66 Label holder
68 Perforated plate
70 Roller (or wheel)
72 Electromagnet
74 Permanent magnet
76 Suction line
78 Suction line system
80 Pressure line
82 Compressed air line system
84 Fluid line
86 Sliding seal
88 Planar drive
90 Base element
92 Upper portion
94 Setting device
A-E Axes
P Path of the object conveyor
R Path

The invention claimed is:

1. A device for labeling objects, wherein the device comprises:

an object conveyor for conveying the objects;

a label conveyor for conveying several labels along a circulating conveyor track by use of several movement devices;

an application region in which the labels conveyed by the label conveyor can be applied to the objects conveyed by the object conveyor; and at least one auxiliary unit module from the group of:

a cutting device for cutting the labels from a label web, a printing device for printing on the labels, an adhesive device for applying an adhesive to the labels, a camera device for monitoring the several movement devices and/or the labels, a service conveyor for unloading movement devices from the label conveyor and loading movement devices onto the label conveyor, at least one label web feed unit for feeding label webs, a splicing device for connecting ends of two label rolls, and a buffer device for buffering labels;

wherein the label conveyor has a long-stator linear drive, a short-stator linear drive, or a planar drive, for magnetically-inductive driving of the several movement devices; and wherein the several movement devices each have a pneumatic holder, for holding the labels, and wherein:

the label conveyor has a suction line system having a stationary inlet, and a fluid connection between the inlet and the pneumatic holder occurs, during a movement of the respective movement device along the circulating conveyor track of the label conveyor, by way of sliding contact to the stationary inlet; and/or the label conveyor has a compressed air line system, having a stationary outlet and a fluid connection between the outlet and the pneumatic holder occurs, during a movement of the respective movement device along the circulating conveyor track of the label conveyor, by way of sliding contact to the stationary outlet.

2. The device of claim 1, wherein:

the label conveyor has several module docking stations, the at least one auxiliary unit module is releasably connected to one of the several module docking stations, and wherein the several module docking stations and/or the at least one auxiliary unit module each have an electrical connector and/or a pneumatic connector.

3. The device according to claim 2, having at least one of the following features:

at least one of the auxiliary unit modules is selectively connectable to each of the module docking stations;

the several module docking stations are formed identically;

the several module docking stations each have at least two, mutually-spaced module docking sites for connecting to the same auxiliary unit module;

the several module docking stations are arranged at least in part on an inner peripheral side with respect to the circulating conveyor track; and the several module docking stations are arranged on several peripheral sides of the label conveyor.

4. The device according to claim 2, wherein:

at least one of the auxiliary unit modules is mounted movably on rollers.

5. The device according to claim 2, wherein:

the device has at least one automated guided vehicle, and at least one of the auxiliary unit modules has a coupling for coupling to the at least one automated guided vehicle; and/or at least one of the auxiliary unit modules is configured as an automated guided vehicle.

6. The device according to claim 2, further comprising:

a further label conveyor for conveying several further labels along a further circulating conveyor track by use of several further movement devices, wherein the further label conveyor comprises several further module docking stations;

wherein at least one of the auxiliary unit modules is movable back and forth between the label conveyor and the further label conveyor for selective connection to one of the several module docking stations and the several further module docking stations.

7. The device according to claim 6, wherein the at least one of the auxiliary unit modules is movable back and forth between the label conveyor and the further label conveyor by use of rollers and/or by use of an automated guided vehicle.

8. The device according to claim 2, wherein:

the printing device is arranged within the circulating conveyor track; and/or the printing device is arranged for printing through a passage in the circulating conveyor track when printing on the labels.

9. The device according to claim 2, wherein:

the circulating conveyor track has, in a plan view of the device, substantially a triangular shape or a rectangular shape; and/or the circulating conveyor track is oriented substantially vertically.

10. The device according to claim 2, wherein:

the several movement devices have several rollers which support the several movement devices on the circulating conveyor track.

11. The device according to claim 10, wherein:

the several movement devices each have a label holder for holding the labels; and each of the several movement devices has at least one roller of the several rollers, wherein the at least one roller comprises at least one of:

an upper roller arranged above the label holder and a lower roller arranged below the label holder;

a roller which is arranged such that a pressing torque for pressing the label onto the object can be brought about by supporting this roller on the circulating conveyor track; and a front roller arranged in front of the label holder with respect to a forward movement direction of the respective movement device, and a back roller arranged behind the label holder with respect to the forward movement direction.

12. The device according to claim 2, further comprising feature (a) and at least one of features (b) and (c):

(a) the service conveyor has a circulating conveyor track along which the several movement devices can be moved; and (b) the circulating conveyor track of the service conveyor has a smaller number of guide rails, arranged one above the other, for supporting the several movement devices than the label conveyor; and/or (c) the service conveyor has a long stator which is arranged above or below the circulating guide track of the service conveyor and/or is arranged so as to be vertically offset with respect to a long stator of the label conveyor.

13. The device according to claim 2, wherein:

the label conveyor has at least one sliding seal, stationary on the label conveyor and/or movable on the several movement devices, which is arranged for sealing the sliding contact; and/or the inlet and/or the outlet is arranged above, below, or at the level of the circulating conveyor track of the label conveyor.

14. The device according to claim 2, wherein:

the label conveyor has a planar drive having a base element that forms the circulating conveyor track and is oriented substantially vertically, and the several movement devices, which are movable over the base element by way of magnetic interaction between the base element and the several movement devices.

15. The device according to claim 14, wherein the device has at least one of the following features:

the base element has an enlarged vertical extension in the application region, so that labels can be applied at different heights;

an upper portion of the base element has a curvature in the application region towards the object conveyor, so that labels can be applied to conical object portions;

the base element is height-adjustable in the application region;

the object conveyor is a conveyor carousel, and the label conveyor extends in an arcuate manner in the application region along an arcuate portion of the conveyor carousel, so that several labels can be applied to the same object;

the several movement devices each carry a setting device which is configured to change an angle of incidence of a label holder with respect to the respective movement device, so that labels can be applied to conical object portions; and the device has a control unit which is configured to operate the several movement devices upstream of the application region so as to rotate about a current movement direction of the respective movement device, so that labels can be applied to conical object portions.

16. A system comprising:

a first device according to claim 2, and a second device having a module docking station, wherein the label conveyor of the first device can be docked on the second device, or at least one of the auxiliary unit modules of the first device can be docked at least indirectly on the module docking station of the second device.

17. A method for labeling objects, comprising:

providing the device according to claim 2;

conveying labels by the label conveyor by use of several movement devices driven independently of one another;

labeling the objects;

treating the labels at least indirectly using the at least one auxiliary unit module; and docking and/or undocking the at least one auxiliary unit module on or from the label conveyor.

18. The device of claim 1, wherein at least one of:

the stationary inlet has several openings arranged in series and/or at least one longitudinal opening, which is/are arranged only upstream of the application region up to the label web feed device; and the stationary outlet has several openings arranged in series and/or at least one longitudinal opening, which is/are arranged only in the application region.

19. The device of claim 1, wherein at least one of:

the suction line is at least one of valve-free and slot-controlled; and the compressed air line system is at least one of valve-free and slot-controlled.

20. The device of claim 1, wherein the printing device is arranged for printing of a front side of the label.

21. The device of claim 20, wherein at least one of:

the printing device is arranged within the circulating conveyor track;

the printing device is arranged for printing through a passage in the conveyor track when printing on the labels; and the printing device is arranged for printing through a gap, a slot, a recess, or a passage opening in the conveyor track when printing on the labels.

22. The device of claim 21, wherein:

a laser printer prints through the passage, or an ink supply line or a print head of an inkjet printer passes through the passage.

* * * * *